(12) United States Patent
Kim et al.

(10) Patent No.: US 10,318,128 B2
(45) Date of Patent: Jun. 11, 2019

(54) IMAGE MANIPULATION BASED ON TOUCH GESTURES

(71) Applicant: ADOBE INC., San Jose, CA (US)

(72) Inventors: Byungmoon Kim, Sunnyvale, CA (US); Gahye Park, San Jose, CA (US)

(73) Assignee: Adobe Inc., San Jose, CA (US)

( * ) Notice: Subject to any disclaimer, the term of this patent is extended or adjusted under 35 U.S.C. 154(b) by 383 days.

(21) Appl. No.: 14/871,000

(22) Filed: Sep. 30, 2015

(65) Prior Publication Data
US 2017/0090728 A1   Mar. 30, 2017

(51) Int. Cl.
| | | |
|---|---|---|
| *G06F 3/048* | (2013.01) | |
| *G06F 3/00* | (2006.01) | |
| *G06F 3/0484* | (2013.01) | |
| *G06T 3/60* | (2006.01) | |
| *G06T 3/40* | (2006.01) | |
| *G06F 3/0488* | (2013.01) | |

(52) U.S. Cl.
CPC ...... *G06F 3/04845* (2013.01); *G06F 3/04883* (2013.01); *G06T 3/40* (2013.01); *G06T 3/60* (2013.01); *G06T 2200/24* (2013.01)

(58) Field of Classification Search
CPC .. G06F 3/04845; G06F 3/04883; G06F 3/048; G06F 3/0481; H04N 5/23216
See application file for complete search history.

(56) References Cited

U.S. PATENT DOCUMENTS

| | | | | |
|---|---|---|---|---|
| 6,469,709 B1 * | 10/2002 | Sakai | ..................... | G06T 3/00 345/619 |
| 7,278,117 B2 * | 10/2007 | Gargi | ................. | G06K 9/00456 715/864 |
| 7,697,016 B2 * | 4/2010 | Sakakura | .................. | G06T 3/60 345/441 |
| 8,218,895 B1 * | 7/2012 | Gleicher | ............... | G06T 3/0025 345/427 |
| 8,810,579 B2 * | 8/2014 | Levien | .................. | G06T 11/203 345/442 |
| 9,851,880 B2 | 12/2017 | Kim | | |
| 2009/0136136 A1 * | 5/2009 | Mori | .................. | G06K 9/00416 382/187 |
| 2010/0289754 A1 * | 11/2010 | Sleeman | ............... | G06F 3/0416 345/173 |
| 2011/0102464 A1 * | 5/2011 | Godavari | .............. | G06F 3/0416 345/650 |

(Continued)

OTHER PUBLICATIONS

Math Open Reference, Radius of an arc or segment, pp. 1-2 (Year: 2015).*

*Primary Examiner* — Mahelet Shiberou

(74) *Attorney, Agent, or Firm* — Shook, Hardy & Bacon L.L.P.

(57) ABSTRACT

Embodiments of the present invention provide systems, methods, and computer storage media for facilitating manipulation of images in response to gestures. A user can provide a gesture to effectuate a desired rotation or scaling of an image region. In some implementations, a user might provide a rotation gesture (i.e., a circular pattern) to cause a rotation of an image region or a stroke gesture (i.e., a straight line pattern) to cause a scaling of an image region. Using intuitive gestures, such as touch gestures, the user can control the direction and magnitude of manipulation to accomplish a desired manipulation (e.g., rotation or scaling) of an image region.

18 Claims, 10 Drawing Sheets

(56) References Cited

U.S. PATENT DOCUMENTS

| | | | | |
|---|---|---|---|---|
| 2011/0109581 A1* | 5/2011 | Ozawa | .................. | G06F 3/0481 |
| | | | | 345/173 |
| 2011/0185297 A1* | 7/2011 | Reid | ................... | G06F 3/04845 |
| | | | | 715/765 |
| 2012/0026194 A1* | 2/2012 | Wagner | ................ | G06F 3/0485 |
| | | | | 345/647 |
| 2013/0300704 A1* | 11/2013 | Takahashi | ............... | G06F 3/017 |
| | | | | 345/173 |
| 2014/0337802 A1* | 11/2014 | Bertsch | .............. | G06F 3/04815 |
| | | | | 715/848 |
| 2015/0097809 A1* | 4/2015 | Heim | .................... | G06F 3/0416 |
| | | | | 345/174 |
| 2015/0199105 A1* | 7/2015 | Hansen | .............. | G06F 3/04815 |
| | | | | 715/851 |
| 2015/0261302 A1* | 9/2015 | Fainstain | ............ | G06F 3/04845 |
| | | | | 345/665 |

\* cited by examiner

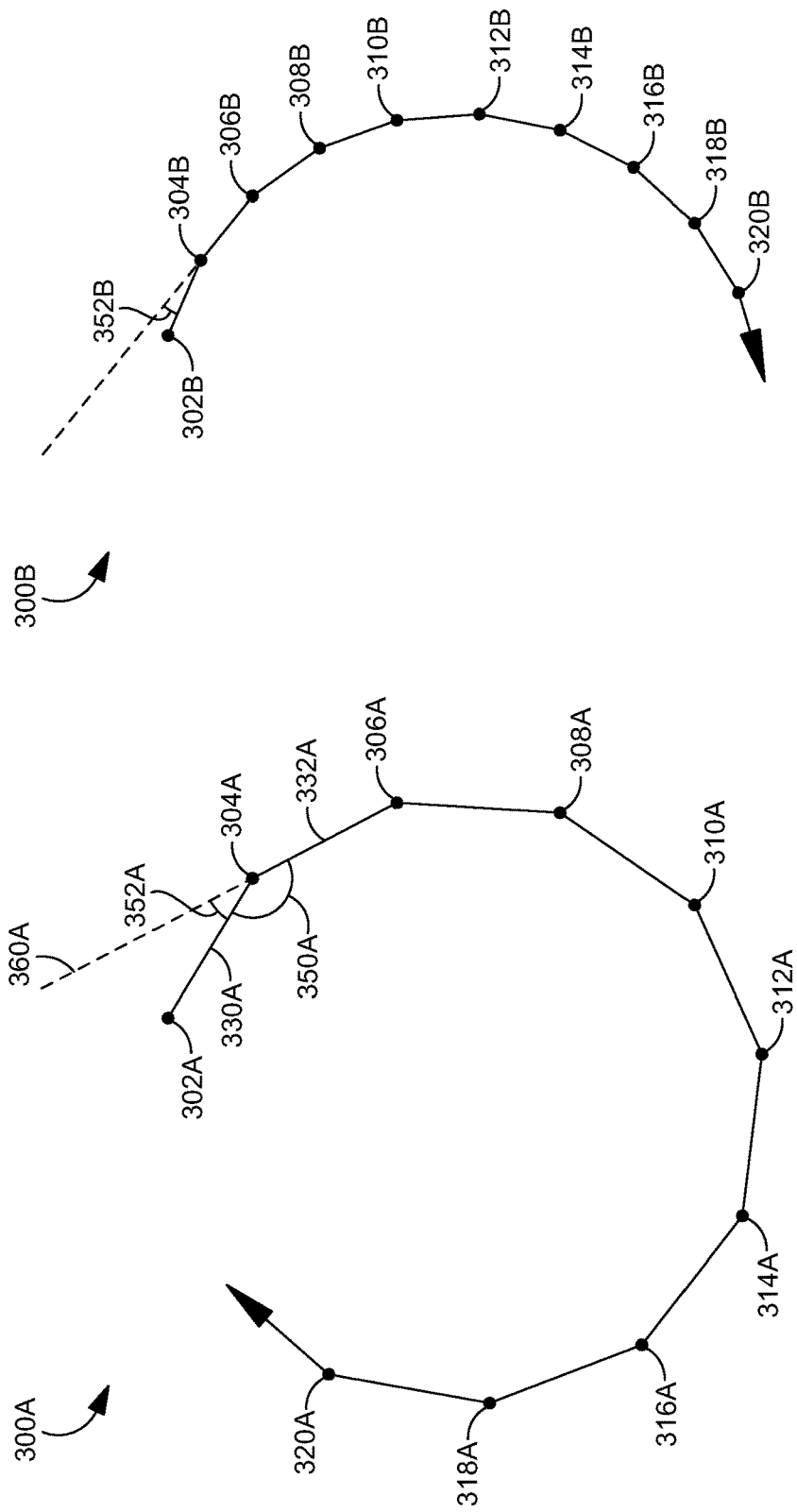

IMAGE MANIPULATION BASED ON TOUCH GESTURES

BACKGROUND

Oftentimes, a user might desire to modify or edit an aspect(s) of an image. In this regard, a user may wish to control various features within an image, for example, due to user preference, flaw in the image, or the like. By way of example, in some cases, a user may desire to expand or contract a scale of a particular aspect of an image. As another example, a user may wish to adjust an orientation at which an aspect within the image appears. To assist in the editing of images, some tools, such as the ADOBE PHOTOSHOP tool, have been developed that provide mechanisms to edit images. Such tools enable a user to edit many aspects of an image as desired by the user. As such, a user can edit images in accordance with the user's preferences to obtain images commensurate with the user's expectations or desires.

To scale or rotate an aspect or feature within an image, however, conventional editing tools used in a non-touch enabled environment have an extensive user interface pane with many user interface elements to initiate such edits. With the rise of mobile device utilization, simplified touch interfaces for editing images has become desirable among users. Many current touch enabled environments, however, include utilization of sliders and buttons that may clutter the user interface, particularly on a mobile device. Further, multi-finger gestures are oftentimes reserved or utilized for various functions, such as scroll, pan, or the like.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to facilitating manipulation of image regions based on a gesture provided by a user. In this way, a user can provide a gesture to effectuate a desired manipulation of an image region. Such an image region can be identified, for example, based on an indicated center point and associated radius. In some implementations, a user might provide a rotation gesture (i.e., a circular pattern) to cause a rotation of an image region within an image or a stroke gesture (i.e., a straight line pattern) to cause a scaling (e.g., zoom-in, zoom-out, pucker, bloat, etc.) associated with an image region. Upon detecting a rotation gesture, the image region can be rotated, for instance. By comparison, upon detecting a stroke gesture, a scaling of the image region can occur, for example, zoom-in or zoom-out. As such, the user can control the direction of rotation or scaling as well as the amount of rotation or scaling by using an intuitive gesture to accomplish a desired manipulation, for example, to edit an aspect of an image.

BRIEF DESCRIPTION OF THE DRAWINGS

The present invention is described in detail below with reference to the attached drawing figures, wherein:

FIGS. 3A-3B illustrate exemplary rotation gestures, in accordance with embodiments of the present invention;

DETAILED DESCRIPTION

Figure 1:
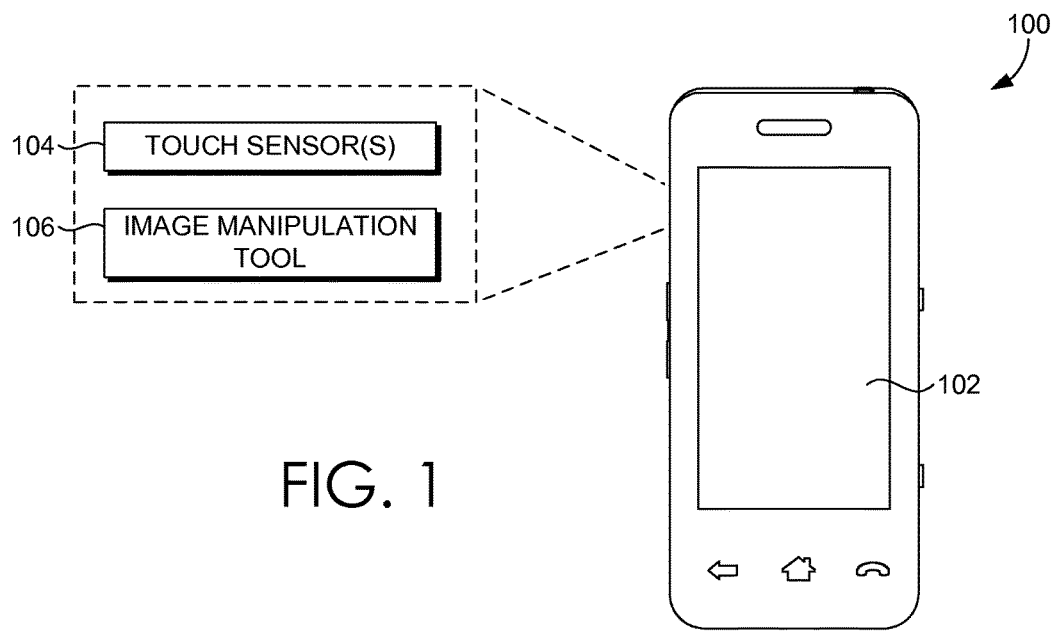
FIG. 1 is a block diagram of an exemplary computing system architecture in which embodiments of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, a user might desire to modify or edit an aspect(s) of an image. As used herein, a user might refer to a photographer or another viewer of the image. In some cases, editing may be desired when an image is not captured as desired by the user. In other cases, editing may be desired to enhance or alter the image, for instance, to beautify an image. By way of example, in some cases, a user may desire to enlarge or compress scaling of a particular aspect of an image. As another example, a user may wish to adjust an orientation at which an aspect within the image appears. In this regard, a user may wish to control various features within an image, for example, due to user preference, flaw in the image, or the like. To assist in the editing of images, some tools, such as the ADOBE PHOTOSHOP tool, have been developed that provide mechanisms to edit images. Such tools enable a user to edit many aspects of an image as desired by the user. As such, a user can edit images in accordance with the user's preferences to obtain images commensurate with the user's expectations or desires.

To scale or rotate an aspect or feature within an image, however, conventional editing tools used in a non-touch enabled environment have an extensive user interface pane with many user interface elements to initiate such edits. With the rise of mobile device utilization, simplified touch interfaces for editing images has become desirable among users. Many current touch enabled environments, however, include utilization of sliders and buttons that may clutter the user interface, particularly on a mobile device.

Embodiments of the present invention are directed to facilitating manipulation of an image region (e.g., portion or aspect of an image) based on a gesture. In this regard, a user can initiate rotation and/or scaling of an image region by providing a gesture to rotate and/or scale the image region. As such, a user can easily and effectively orient or size an image region to his or her liking. The user may control the direction of rotation and scaling, as well as the amount of rotation and scaling, by using an intuitive touch gesture to accomplish a desired manipulation, for instance, to edit or view an image. Although the description provided herein is generally directed to manipulating an image region, as can be appreciated, other types of data or content could similarly be manipulated based on a gesture. As such, in addition to an image editing environment, manipulation may occur in any number of environments including any non-image editing environment.

To initiate manipulation of an image region, a user can provide a gesture to effectuate a desired manipulation of the image. A gesture refers to a movement or action initiated by a user used to express an intention, instruction, or signal. A gesture may be a touch gesture or an air gesture. A touch gesture refers to a gesture indicated through a touch interface. As such, a touch gesture is detected through use of touch recognition technologies. As can be appreciated, a touch gesture can be a single touch gesture. That is, a single contact point of a finger is used to perform the touch gesture (as opposed to using two or more, for example, two fingers, to perform a gesture). Using only a single finger to manipulate an image region reduces intervention with other multi-finger gestures that are oftentimes used for zooming, scrolling, panning, or other actions such as closing applications. An air gesture refers to a gesture indicated by a user made in space (e.g., movement of a user's finger in space). An air gesture can be detected through use of technologies that can recognize motion made in an environment (three-dimensional environment). Such technologies may include image capturing devices (e.g., video cameras, still image cameras, etc.), accelerometers, magnetometers, gyroscopes, etc.

A gesture can be of any type, pattern, or movement and is not intended to be limited in scope. Examples of gestures include, by way of example and not limitation, a point, a line, a shape (e.g., circle), a pattern, or the like. A rotation gesture, as used herein, refers to a gesture that indicates a rotation of motion or a circular motion. A stroke gesture, as used herein, refers to a gesture that indicates a line or straight line of motion. In some implementations, a user might provide one type of gesture (e.g., a rotation gesture) to cause rotation of an image region and another type of gesture (e.g., a stroke gesture) to cause scaling associated with an image region. Although the description provided herein is generally directed to a touch gesture, as can be appreciated, other types of gestures could be similarly used to manipulate an image region or other content. For example, an air gesture could be used to initiate rotation of an image region.

Upon detecting a gesture, an image region can be manipulated (e.g., rotated and/or scaled) in accordance with the detected gesture. For example, when a rotation gesture is detected, the image region might be rotated in-plane, or about a z-axis. As another example, when a stroke gesture is detected, the image region can be scaled, for instance, zoomed-in or zoomed-out, puckered or bloated, etc. As will be discussed in further detail below, an image manipulation tool can be used to facilitate manipulation of image regions based on gestures. The image manipulation tool can perform such functionality in association with any type of gestures. Further, the manipulating functionality described herein can be applied to any type of data or content including, for example, images, web content, text, photographs, documents, or the like.

In accordance with embodiments of the present invention, FIG. 1 illustrates an exemplary computing device 100 that is utilized to facilitate image manipulation based on a touch gesture(s) provided by a user. The computing device 100 can be any device associated with a display screen 102, such as the computing device 1100 of FIG. 11. The display screen 102 is a screen or monitor that can visually present, display, or output information, such as, for example, images, text, figures, values, symbols, videos, video clips, movies, photographs, lists, data sets, webpages, emails, text messages, notifications, or any other content. In some embodiments, the computing device 100 is a portable or mobile device, such as a mobile phone, a personal digital assistant (PDA), a video player, a laptop, or any other portable device associated with a display screen. In some implementations, the computing device 100, such as a portable device, includes the display screen 102 (as illustrated in FIG. 1). That is, a display screen is integrated or coupled with the portable device. In other implementations, a display screen is remote from, but in communication with, the computing device.

The display screen 102 may be a touchscreen display, in accordance with embodiments described herein. A touchscreen display enables detection of location of touches or contact within a display area. In this regard, a touchscreen display refers to a display screen to which a user can provide input or interact therewith by making physical contact or near contact with the display screen. An illustrative example includes a user utilizing his or her finger to tap or move, or use some other form of touch action, to interact with a user device. Other items, such as a stylus, fingernail, etc., may be used to provide input to the device by way of touchscreen display. As such, a touchscreen display can be used as an input component irrespective of whether a keyboard or mouse is used as an input component for interacting with displayed content. Touchscreen displays can be implemented using any of a variety of touchscreen technologies. By way of example, and not limitation, a touchscreen display might be based on various touchscreen technologies such as resistive, surface-acoustic wave, capacitive, infrared, optical imaging, dispersive signal technology, acoustic pulse recognition, and other technologies known in the art.

As shown in FIG. 1, the exemplary computing device 100 includes a touch sensor(s) 104. A touch sensor(s) 104 may be any touch sensor(s) that detects contact or touch of an object with the touchscreen display 102 of the computing device 100. Such an object may be, for example, a user digit (e.g., a finger), a stylus, or another component that contacts a touchscreen display. A touch sensor(s) 104 may be any sensor suitable to detect an indication of touch, such as, for example, a capacitive sensor or a resistive sensor. As can be appreciated, any number of touch sensors may be utilized to detect contact with a touchscreen display.

In operation, a touch sensor detects contact of an object with at least a portion of a touchscreen display 102 of the computing device 100. A touch sensor may generate a signal based on contact with at least a portion of the touchscreen display 102 associated with the computing device 100. The signal generated by the touch sensor(s) may be communicated to the image manipulation tool 106 such that the image manipulation tool 106 can facilitate manipulation of an image.

In one embodiment, the touch sensor(s) 104 may be calibrated to generate a signal or communicate the signal upon exceeding a certain threshold generally accepted as being representative of sufficient contact. For example, in an instance when a touch sensor(s) 104 measures a certain threshold temperature or conductivity, the touch sensor(s) 104 may generate a signal and communicate the signal to the image manipulation tool 106. On the other hand, when the touch sensor(s) 104 does not measure the certain threshold temperature or conductivity, the touch sensor(s) 104 may fail to generate the signal or communicate the signal to the image manipulation tool 106. The touch sensor(s) 104 may be configured to generate signals based on direct human touch or touch using another object (e.g., a stylus, etc.). As can be appreciated, the sensitivity of the touch sensor(s) 104 implemented into the device 100 can affect when contact is registered or detected.

As described, the touch sensor(s) 104 transmits signals to the image manipulation tool 106 to indicate contact with the touchscreen display 102. The image manipulation tool 106 is generally configured to facilitate manipulation of images. As such, upon referencing signals indicating a touch event in connection with the touchscreen display 102, the image manipulation tool 106 can utilize such data to identify a manner in which to manipulate the image and, thereafter, initiate manipulation of the image. In some cases, the image manipulation tool 106 is part of an application that performs the image manipulation. For example, the image manipulation tool 106 might perform image manipulation functionality within image processing or image editing software. In other cases, the image manipulation tool 106 might be distinct from an application that performs the image manipulation. In this regard, the image manipulation tool 106 might identify a manner in which to manipulation an image and, thereafter, communicate with an application that subsequently performs the image manipulation. Irrespective of whether the image manipulation tool 106 or another component performs the image manipulation, a user of the computing device 100 can generally view the image manipulation via the touchscreen display 102.

Figure 2:
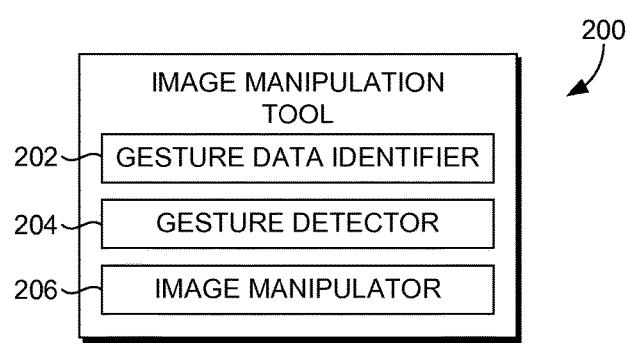
FIG. 2 is a block diagram of an exemplary image manipulation tool for facilitating manipulation of image regions based on touch gestures, in accordance with embodiments of the present invention.

Turning now to FIG. 2, a block diagram is provided illustrating an exemplary image manipulation tool 200 in which some embodiments of the present invention may be employed. The image manipulation tool 200 is generally configured to facilitate image manipulation based on gestures. As shown in FIG. 2, the image manipulation tool 200 includes a gesture data identifier 202, a gesture detector 204, and an image manipulator 206. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The gesture data identifier 202 is configured to identify gesture data associated with a gesture. Gesture data refers to any data that indicates or describes a gesture, such as a touch gesture, provided by a user. Gesture data might include, for example, a position indicator, a direction indicator, a velocity indicator, an acceleration indicator, a magnitude indicator, a steering angle, a time component or time duration associated therewith, a center region indicator, or the like. A position indicator refers to an indication of a position, location, or area of a gesture (e.g., contact with a touchscreen display). Accordingly, a position indicator might be a pixel(s) contacted, an x and/or y coordinate associated with a point(s) of contact (e.g., an x and/or y coordinate of a pixel that corresponds with a contacted area of a touch display screen), or the like. A direction indicator refers to a direction of a gesture, such as a rotation gesture or a stroke gesture. A velocity indicator refers to a velocity of a gesture. An acceleration indicator refers to an acceleration of a gesture. A magnitude indicator refers to a magnitude, distance, extent, displacement, or degree of a gesture. A center region indicator refers to an indication of a center point that is selected to indicate a center of an image region to be manipulated (e.g., rotated, scaled).

A steering angle refers to an angle between position indicators associated with a gesture of a user. As can be appreciated, a steering angle might be an interior angle or an exterior angle. An interior angle is an angle formed by two sides of a polygon that share an endpoint. An exterior angle is an angle formed by one side of a polygon and a line extended from an adjacent side. As such, in some cases, to compute the steering angles, a line segment may be drawn or provided between position indicators to facilitate computation of the steering angle between the lines.

By way of example, and with reference to FIG. 3A, assume that gesture 300A is performed. In accordance with performance of gesture 300A, a first position indicator 302A, a second position indicator 304A, and a third position indicator 306A are identified resulting in a first line 330A between the first position indicator 302A and the second position indicator 304A and a second line 332A between the second position indicator 304A and the third position indicator 306A. An interior steering angle 350A is illustrated as the angle formed by two sides (i.e., lines 330A and 332A) of the polygon that share an endpoint (i.e., the second position indicator 304A). An exterior steering angle 352A is illustrated as the angle formed by one side 330A of the polygon and a line 360A extended from an adjacent side 332A.

Gesture data, such as position indicators, velocity indicators, acceleration indicators, or the like, can be associated with a time component. A time component can be any suitable component of time, such as, for example, a time or a time period. A lapse of a time period, such as one-tenth of a second (i.e., 0.1 second), may indicate a time at which to obtain gesture data. In this regard, each 0.1 second may correspond with a new position indicator and data associated therewith (e.g., a steering angle). Identifying or capturing position indicators to correspond with a time component might occur in any manner. For example, in some cases, sensors may coordinate detection of a touch position in accordance with a predetermined time component (e.g., every 0.1 seconds). As such, upon the lapse of each 0.1 second time duration, the sensor may detect a touch position. As another example, signals may be generated by a sensor(s) without reference to a time component while the gesture data identifier 202 correlates and captures touch positions corresponding with a specified time component.

In embodiments, gesture data might be raw data generated by one or more touch sensors, such as touch sensor(s) 104 associated with touchscreen display 102 of FIG. 1. In such embodiments, the gesture data identifier 202 might receive, retrieve, or access signals from one or more touch sensors indicating touch. Alternatively or additionally, gesture data may be derived, calculated, identified, or determined, for example, based on raw data generated by touch sensors. That is, signals generated from touch sensors may be processed to identify gesture data. By way of example only, signals received by the gesture data identifier 202 can be processed to determine x and/or y coordinates identifying locations that correspond with an area of a touchscreen display contacted by an object. Upon identifying position indicators, other types of gesture data, such as steering angles, can be determined. Any algorithm and/or lookup technique can be utilized to normalize, determine, calculate, identify, and/or derive various types of gesture data.

In embodiments, the gesture data identifier 202 can record and store gesture data. As can be appreciated, any amount of gesture data can be recorded or stored. Further, gesture data can be stored for any amount of time. For example, gesture data may be temporarily stored such that the data is disposed upon rotation of an image region. As can be appreciated, in some implementations, the gesture data identifier 202 might be configured to perform calculations and determinations of gesture data, such as direction, velocity, steering angles, etc., associated with a gesture. In other cases, the gesture data identifier 202 might be configured to obtain some gesture data, such as position indicators, while other gesture data, such as velocity, steering angles, and/or direction, might be determined by another component, such as the gesture detector 204 or image manipulator 206. Any component can be suitable for making such calculations and determinations, and embodiments of the present invention are not intended to be restricted to any particular component performing these calculations.

The gesture detector 204 is configured to detect gestures, such as touch gestures, initiated by users. As previously described, a gesture can take on any shape or pattern, such as, for example, a rotation or circular pattern, a stroke or straight line pattern, a polygonal shape, or the like. In some implementations, a type of gesture being performed might be selected from a predetermined set of gesture types. In this regard, the gesture detector 204 may determine whether a gesture aligns, matches, or corresponds with one of a particular set of gestures. In one embodiment, the gesture detector 204 determines whether a gesture is a rotation gesture or a stroke gesture.

The gesture detector 204 may utilize steering angles to detect a type of gesture. In some implementations, a set of steering angles associated with a set of position indicators can be used to detect a type of gesture. In this way, a sequence of steering angles corresponding with a set of positions indicators can be analyzed. As previously described, a position indicator refers to a position or location of a point of contact made during a gesture. A set of position indicators, or a position indicator set, refers to a set of sequential position indicators. In some cases, the set of position indicators is associated with a time component such that each position indicator is captured upon a lapse of a time interval (e.g., 0.01 second). A set or sequence of position indicators may include any number of position indicators, such as, for instance, a set of ten position indicators, a set of twenty position indicators, a set of fifty positions indicators, etc.

By way of example only, and with reference to FIG. 3A, assume that a set of ten position indicators 302A-320A are captured in connection with a user gesture, with each position indicator being captured upon a lapse of 0.01 second after capturing the previous position indicator. In such an example, steering angles, such as steering angle 350A or 352A, associated with position indicators 302A-320A are computed. As described above, line segments might be used between the position indicators to identify the steering angles between the line segments. For example, the interior steering angle 350A may be calculated between the line segment 330A and 332A. The sequence of steering angles associated with position indicators 302A-320A can then be used to identify or detect a gesture being input by a user.

In this regard, the gesture detector 204 may compare the steering angles to one another to detect a gesture. Various methods can be employed to determine the gesture type based on steering angles. For example, in one implementation, steering angles that are random, alternate, or otherwise inconsistent in direction may indicate a straight line or stroke gesture, particularly if the exterior steering angles are small. That is, because a line being drawn by a user is generally not completely straight and varies slightly from one direction to another, a line or stroke may be inferred as an intended gesture by the user. By contrast, steering angles that are constant or consistent in one direction may indicate a rotation gesture. As can be appreciated, in determining whether steering angles are consistent or a same direction, a direction threshold might be used. In this regard, a direction threshold might be used to determine whether steering angles are in the same direction or consistent. For instance, assume that ten steering angles are analyzed. Further assume that a direction threshold is 90%. In such a case, the steering angles are considered to be the same or consistent in direction if at least nine of the ten angles indicate a same direction or a rotation (e.g., in the positive direction).

Alternatively or additionally, magnitudes or degrees of steering angles may be used to determine a type of gesture. For instance, exterior steering angles larger in degree may tend to indicate a rotation gesture rather than a stroke gesture. By contrast, exterior steering angles smaller in degree may tend to indicate a stroke gesture. In some implementations, a gesture threshold value might be used to indicate a gesture type. For example, a steering angle greater than a threshold value might indicate a rotation gesture, while a steering angle less than a threshold value might indicate a stroke gesture.

The image manipulator 206 is configured to initiate manipulation of image regions based on detected gestures, such as touch gestures. By way of example, if a rotation gesture is detected, the image manipulator 206 initiates a rotation of an image region, area, or portion. If a stroke gesture is detected, the image manipulator 206 may initiate scaling associated with an image region, area or portion. As previously described, the image manipulator 206 can perform the image manipulation or can initiate the image manipulation to be performed by another application.

To manipulate an image region (e.g., rotate or scale the image region), the image manipulator 206 may determine the image region within the image to manipulate. As described, an image region is a region or area within an image that is to be manipulated. The image region described herein generally takes the form of a circular shape, but any number of shapes can be indicated or used as an image region.

In some embodiments, an image region is identified using a center region indicator and a radius. A center region indicator can be indicated by a user by a touch or tap selection on the image. In some cases, a user provides an indication of a center region prior to performing a manipulation gesture (e.g., a rotation manipulation or a stroke manipulation). For instance, a user might touch an image at a center point indicating a center of a region the user would like to manipulate. In some cases, the selected center point may be represented on the user interface so that the user can view a visual indication. This can enable a user to accurately pick the center of the image region. For instance, by tapping another location within the image, the user can adjust the location of the center.

A radius may be defined or determined in any number of ways. In some cases, a radius might be of a fixed or predefined distance or physical size, or user selectable (e.g., via a slider). In such a case, the radius can be relative in size to the image or user device. To have a smaller image region, the user can zoom in, and to have a larger image region, the user can zoom out. For example, if a user zooms in on the image, the radius might cover less of the image (e.g., an eye of an individual within the image), while if the user zooms out on the image, the radius might cover more of the image (e.g., an entire face of the individual within the image). As another example, if a user applies a pinch gesture, the entire images becomes smaller and the fixed region covers more of the image. Another implementation for defining a radius may be based on the distance from the designated center region at which a user initiates a manipulation gesture. By way of example only, assume that a user selects a image region center by making contact with a distinct portion of the image. Further assume that a user removes his or her finger and makes a new contact to begin a rotation gesture at a distance from the image region center. In such a case, the distance between the image region center and the gesture manipulation contact can be defined as the radius used to designate or determine the image region to manipulate.

In other embodiments, an image region can be identified without utilizing a center region indicator. For example, in some cases, a user may begin a rotation manipulation gesture to initiate rotation of an image region without selecting a center point. To this end, a region center or fixed radius may not initially exist, but rather the image region to be manipulated can be identified based on the gesture data associated with the touch input. As the user begins providing a rotating touch input, a radius and center point can be calculated based on the movement path of the touch input. In some cases, the rotation center can be moving constantly in accordance with the rotation gesture.

In one implementation, the radius can be computed from the inverse of the curvature. In this regard, the curvature vector H can be computed using 1D Laplace-Beltrami operator. The length H reflects curvature. In some cases, the below calculation can be performed to compute the curvature vector H:

$$\vec{H} = \frac{\left(\frac{P_i - P_{i-1}}{\|P_i - P_{i-1}\|} - \frac{P_{i-1} - P_{i-2}}{\|P_{i-1} - P_{i-2}\|}\right)}{\left(\frac{\|P_i - P_{i-1}\| + \|P_{i-1} - P_{i-2}\|}{2}\right)}$$

wherein $P_i$ is an indication of a position. The radius r can be calculated as:

$$r = 1/|H|$$

As such, the center can be a point along the direction $-H/|H|$ by a distance r. The center and radius output can be stabilized by taking an average over time.

In embodiments, the image manipulator 206 utilizes gesture data, such as gesture data identified by the gesture data identifier 202, to determine a manner in which to manipulate an image. Stated differently, gesture data is utilized to determine manipulator attributes for use in manipulating an image region. A manipulation attribute refers to any attribute or data associated with, describing, or indicating manipulation to apply to an image. Manipulation attributes might indicate, for instance, an axis for an image region to rotate about (e.g., a x-axis, a y-axis, any line on xy-plane passing the origin, or a z-axis), a direction for image region rotation (e.g., positive (+), negative (−), clockwise, counter-clockwise, etc.), an indication of image region expansion or contraction, an angular displacement or magnitude for image region rotation (e.g., degrees, angles, radians, revolutions, etc.), an angular speed for image region rotation (e.g., radians per time unit, degrees per time unit, etc.), an angular velocity for image region rotation (e.g., angular speed for an image and the axis about which the image is to rotate, for instance, measured in degrees per time unit or radians per time unit), an angular acceleration for image region rotation (e.g., rate of change of angular velocity, for instance, measured in radians per second squared or degrees per second squared), a magnitude, degree or extent for image region scaling, a speed for image region scaling, or the like. Manipulation attributes might be measured or represented using any unit of measurement including, but not limited to, standardized measurements (e.g., International System of Unit) or other forms of measurement.

To determine one or more manipulation attributes, gesture data associated with a set of position indicators might be analyzed. For example, steering angles, gesture direction, velocity, or the like corresponding with a set of position indicators associated with a touch (or air) gesture can be used to identify one or more manipulation attributes to utilize in manipulating the image. The set of position indicators analyzed might be any number of position indicators, such as ten position indicators, twenty position indicators, thirty position indicators, or the like. The position indicators set might include an indication of a current point of contact and prior points of contact separated by a time interval. For example, assume that a set of ten position indicators are used for determining a rotation attribute(s) to apply to an image at a particular instance. In such a case, a current position indicator and the nine prior position indicators might be used for determining a rotation attribute(s) to apply to an image at that time.

In operation, the image manipulator 206 might determine various manipulation attributes based on a type of gesture detected, for example, via the gesture detector. Although rotation attributes associated with a rotation gesture input by a user and scaling attributes associated with a stroke gesture input by a user are described in more detail below, manipulation attributes can be determined for any type of gesture. Embodiments of the present invention are not intended to be limited to determining a manner in which to manipulate an image region in accordance with such rotation and stroke gestures.

As previously described, a rotation gesture can indicate an intent to effectuate an image region rotation. In this regard, in response to detecting a rotation gesture, an image region is rotated in the plane of the display screen. By way of example, assume that an axis associated with a display screen includes an x-axis in the horizontal direction of the display screen and a y-axis in the vertical direction of the display screen. In such a case, the image region is rotated in the xy-plane or about a z-axis (axis of rotation). The xy-plane of rotation is the plane orthogonal to the z-axis such that the z-axis is a surface normal of the xy-plane. Rotation in the xy-plane (plane of rotation) or about the z-axis, in this example, is referred to as an in-plane rotation. It is understood that use of an xy-plane as a plane of rotation is only exemplary and other configurations of planes and axes can be used to implement embodiments of the present invention.

Upon determining that a gesture is a rotation gesture, the image manipulator 206 can determine a direction in which to rotate the image (e.g., in an xy-plane) or about an axis (e.g., a z-axis). In this way, the image manipulator 206 can recognize whether to rotate the image clockwise or counter-clockwise, for instance, about a z-axis. A direction in which to rotate the image might be based on, for example, the direction in which the set of position indicators are sequentially directed or proceeding. Typically, a direction in which to rotate an image can correlate to a direction of the rotation gesture. For instance, assume that a rotation gesture is detected to occur in a clockwise direction. As such, the image rotation can also be determined to be in the clockwise direction. Although the image rotation might typically be determined to occur in the same direction as a rotation gesture, embodiments of the present invention are not intended to be limited thereto. For instance, in some implementations, it might be desired to rotate an image in the opposite direction as the detected gesture.

In addition to recognizing a direction in which to rotate an image region, the image manipulator 206 can also determine an extent or magnitude with which to rotate the image region. To do so, the image manipulator 206 may analyze steering angles associated with a touch gesture to determine a rotation magnitude for applying to the image region. In some embodiments, steering angles associated with a set of position indicators might be analyzed to determine a rotation magnitude. For example, steering angles, such as exterior steering angles, associated with a set of ten position indicators might be analyzed to determine an extent with which to rotate the image. In one implementation, the steering angles can be averaged to avoid noise that might otherwise exist. By way of example, and with reference to FIG. 3A, steering angles associated with position indicators 302A-320A can be averaged to calculate an average steering angle associated with a set of position indicators. In some cases, a rotation magnitude might be equal to the average steering angle. In other cases, a rotation magnitude might be a product of the average steering angle multiplied by a constant factor, such as 0.02. Such a constant factor might be used, for example, to slow the rotation of the image.

As can be appreciated, as a gesture is performed at a faster speed, the image region in turn can be rotated at a faster rate, such that the user can control the speed at which an image is rotated. By way of example only, and with reference to FIGS. 3A and 3B, gestures 300A and 300B occurring at different speeds are illustrated. Gesture 300A includes ten position indicators 302A-320A, and gesture 300B includes ten position indicators 302B-320B. For purposes of illustration, the gestures 300A and 300B are provided along a same pattern of rotation, but gesture 300A is moving at twice the speed as 300B. As such, in the same amount of time, gesture 300A nearly completes a circular rotation, while gesture 300B only completes approximately half of a circular rotation. As illustrated, the exterior steering angle 352A of gesture 300A is larger than the exterior steering angle of 352B of gesture 300B. As a result, while an image region would be rotated about a same axis in the same direction (e.g., about a z-axis in the clockwise direction), the image would be rotated at a faster speed with respect to the gesture 300A than the speed of rotation responsive to gesture 300B. For instance, assume that exterior steering angle 352A is 30 degrees and that the average of the steering angles associateda2 with position indicators 302A-320A equals 30 degrees. Further assume that the exterior steering angle 352B is 20 degrees and that the average of the steering angles associated with position indicators 302B-320B equals 20 degrees. Multiplying both steering angle averages by a constant factor of 0.02 equals 0.6 degrees and 0.4 degrees, respectively. As such, at a particular instant, the image is moved 0.6 degrees in response to the gesture 300A while an image being rotated in response to the gesture 300B would only rotate 0.4 degrees. As illustrated, the speed of the gesture 300A causes the image to be rotated at a greater magnitude per unit of time thereby increasing the speed of the image rotation.

Figure 4A:
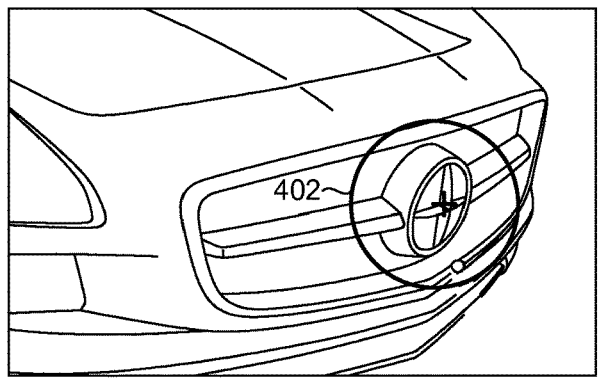
FIGS. 4A-4C illustrate exemplary image region rotations based on rotation gestures, in accordance with embodiments of the present invention.
Figure 4B:
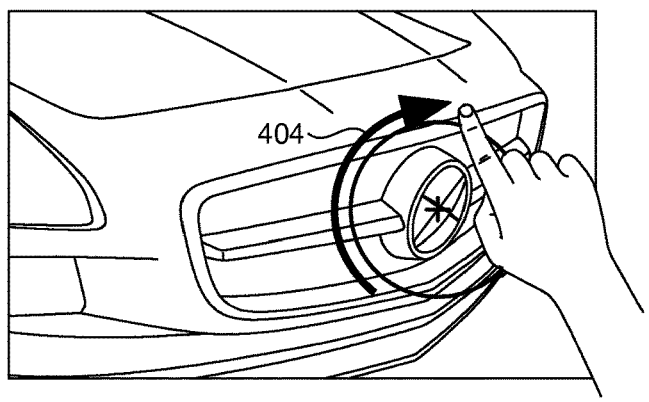
Figure 4C:
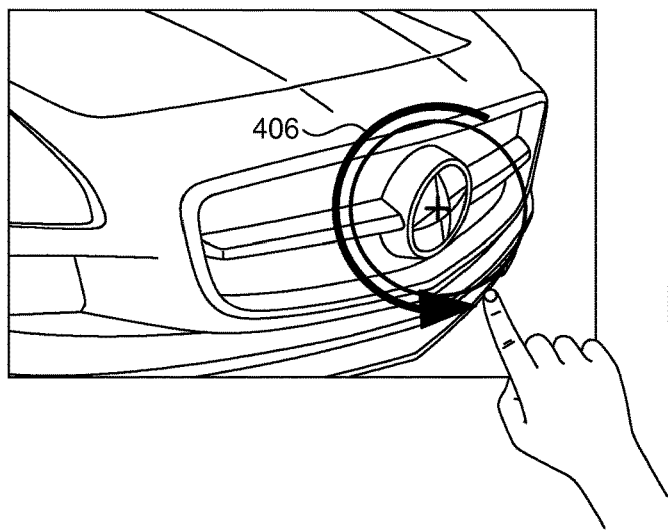

FIGS. 4A-4C illustrate an exemplary embodiment of image region rotation based on a rotation gesture. With initial reference to FIG. 4A, assume that an image region 402 being viewed is desired to be rotated. Upon the user providing a rotation gesture that follows the rotation path 404 illustrated in FIG. 4B, the image region 402 is rotated in-plane in the clockwise direction of the rotation gesture. Now assume that a rotation gesture follows the rotation path 406 illustrated in FIG. 4C and, as such, the image region 402 is rotated in-plane in the counter-clockwise direction of the rotation gesture.

Returning to FIG. 2, as previously described, a stroke gesture can be detected when the gesture is generally in a straight line. A stroke gesture can indicate scaling of an image region. In this regard, the scale of an image region can be modified in accordance with a stroke gesture. Scaling an image region can refer to various types of performing a scaling in association with the image region. In one embodiment, scaling refers to a pucker or bloat operation or scaling. Pucker (reduce) or bloat (expand) refer to scaling of the image region, wherein the scaling of the image region edges varies from the scaling of the center of the region (non-uniform scaling). For example, a scale may occur at a maximum or peak magnitude at the center area of the image region and at a zero or minimal magnitude as the edge of the image region is approached. As such, the image region can appear warped toward the center of the image region. In other cases, scaling can refer to zoom-in or zoom-out, that is, view scaling or zoom to view. In yet other cases, scaling can refer to uniform scaling of the pixels on the image (e.g., enlarge or reduce pixels).

Upon determining that a gesture is a stroke gesture, the image manipulator 206 can determine whether to enlarge or contract the scale of the image region. Whether to enlarge or contract the scale might be determined based on a direction of a stroke gesture. Such a determination can be made in any number of manners, some of which are described herein but are not intended to limit the scope of embodiments of the present invention.

In one implementation, when the stroke gesture motion is generally towards the center point or the center of the image region, it can be determined that the scale of the image region is contracted. On the other hand, when the stroke gesture motion is generally way from the center point or the center of the image region, it can be determined that the scale of the image region is expanded. Such a direction determination can be made, for instance, based on a sequence of points in which the gesture motion is moving.

In another implementation, motion zones may be generated based on an initial touch point for beginning the stroke gesture. Motion zones refer to various areas associated with the image that result in a particular function when the gesture extends into that zone. Motion zones may be, for instance, an expansion zone, a contraction zone, an inactive zone, or the like. When the gesture motion is moving into a dead or inactive zone, the image region is not manipulated. When the gesture motion is moving into an expansion zone, the scale of the image region is enlarged, or zoomed-in. When the gesture motion is moving into a contraction zone, the s of the image region is contracted, or zoomed-out. In some cases, the below algorithm may be employed to determine whether to scale an image region by expanding or contracting the scale associated with the image region.

If $P_{current}-P_{initial} > P_{previous}-P_{initial}$, apply a scale reduction;

Otherwise, apply a scale expansion

Figure 5:
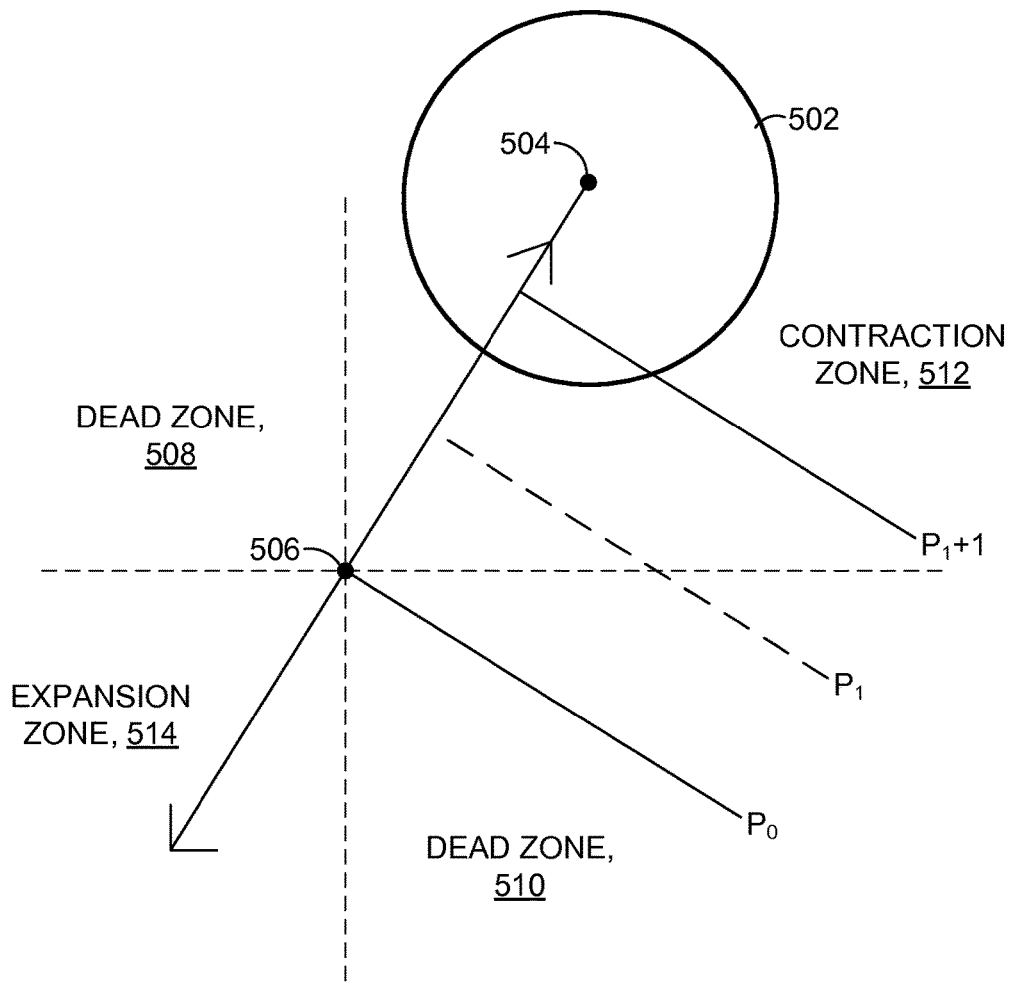
FIG. 5 illustrates a set of motion zones, in accordance with an embodiment of the present invention.

By way of example, and with reference to FIG. 5, assume an image region 502 includes a center point 504. Now assume that a user initiates a stroke gesture at point $P_0$ 506. Dead zone 508, dead zone 510, contraction zone 512, and expansion zone 514 can be generated based on the initial point $P_0$ 506. In the event the user moves into the contraction zone 512, the content in the image region 502 contracts. On the other hand, if the user moves into the expansion zone 514, the content in the image region 502 expands.

In addition to recognizing whether to expand or contract content within an image region, the image manipulator 206 can also determine an extent or magnitude with which to scale of the image region. To do so, the image manipulator 206 may analyze distance or velocity associated with a stroke gesture to determine a scaling magnitude for applying to the image region content. In some embodiments, distance or velocity associated with a set of position indicators might be analyzed to determine a scaling magnitude. For example, distance or velocity associated with a set of ten position indicators might be analyzed to determine an extent of which to scale the image. In one implementation, a total distance or velocity associated with the set of position indicators may be calculated. In another implementation, an average of the distances or velocities associated with the set of position indicators may be calculated. A distance or velocity associated with the set of position indicators can be used to identify a scaling magnitude for applying to the image region content. In other cases, an identified position distance can be multiplied by a constant factor, such as 0.02. Such a constant factor might be used, for example, to determine an amount of image region content scaling that is most suited for the target device. For example, $P_{current}-P_{previous}$ multiplied by a constant K can indicate the extent or amount to scale image region content. In this regard, a user moving faster will result in the positions being further apart and therefore a greater scale resize of the image region content. A constant factor can be selected, for instance, based on experimentation with various constant factors and resulting image manipulations. The actual constant used can be different for different devices, screen sizes, types of users, types of devices, or the like.

Figure 6A:
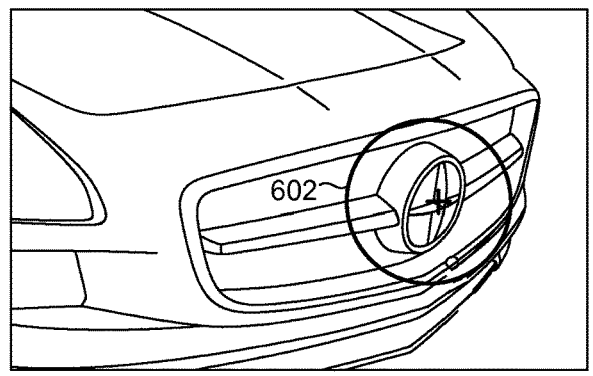
FIGS. 6A-6C illustrate exemplary scaling of an image region based on stroke gestures, in accordance with embodiments of the present invention.
Figure 6B:
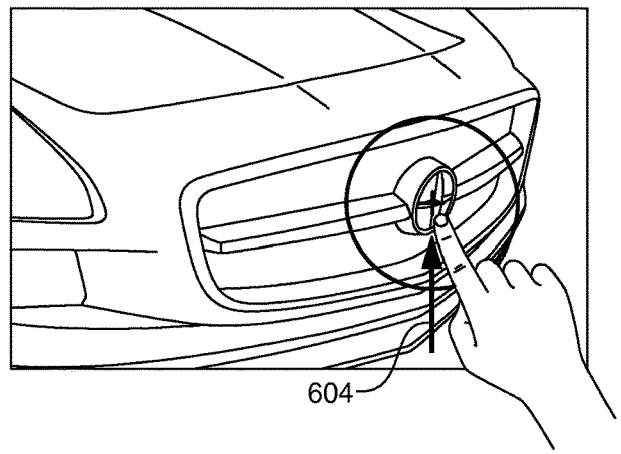
Figure 6C:
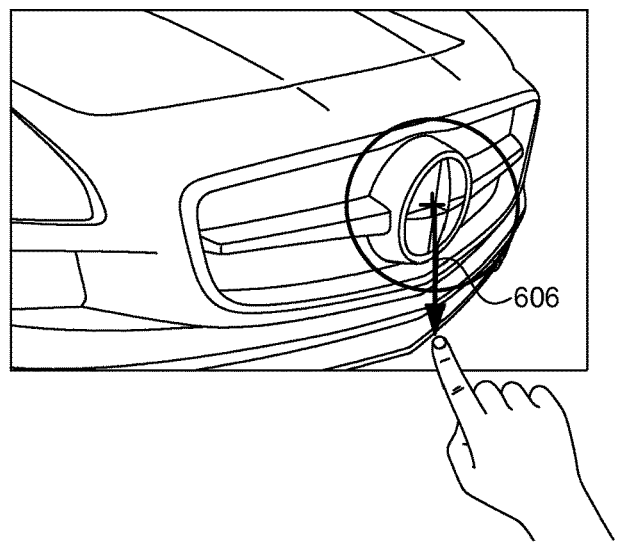

By way of example, and with reference to FIGS. 6A-6C, a stroke gesture is illustrated resulting in scaling of an image region. Initially, with respect to FIG. 6A, assume that an initial image region 602 is identified. Now assume that a user provides a stroke gesture in the path illustrated by 604 of FIG. 6B towards the center point of the image region 602. As shown in FIG. 6B, the scaling of the image region is bloated in response to the inward stroke gesture. Now assume that the user provides a stroke gesture in the path illustrated by 606 of FIG. 6C away from the center point of the image region 602. As illustrated, the scale of the image region is puckered in response to the outward stroke gesture.

Returning to the image manipulator 206 of FIG. 2, the image manipulator 206 can initiate manipulation of the image region in accordance with the determined manipulation attributes, such as direction and rotation magnitude. Such a manipulation of the image region can be calculated and/or initiated at any time. For example, upon the lapse of a predetermined time component, manipulation attributes to apply to an image region can be calculated and implemented. By way of example only, assume that a time component of 0.01 second is used. In such a case, upon the expiration of a 0.01 second time duration, a manipulation attribute(s) to apply to the image is calculated and applied such that the image is manipulated each 0.01 second in accordance with the gesture provided by the user.

As can be appreciated, a set of position indicators utilized in determining rotation attributes can evolve with the time. For example, assume that a time unit of 0.01 is used for identifying a new position indicator and for calculating a rotation attribute(s) for rotating the image. In such a case, upon the lapse of a 0.01 time period, a new position indicator is obtained and can be utilized in determining one or more rotation attributes for image rotation. As such, upon obtaining a new position indicator, the set of position indicators can be modified to include the new position indicator and exclude the earliest position indicator. Alternatively, the set of position indicators can be modified to include the new position indicator without removing any position indicators. The image can then be rotated in accordance with the new set of position indicators. As the image can be rotated in accordance with the time component (e.g., each 0.01 second at the time a new position indicator is captured), an angular velocity is effectively applied to the image rotation.

Figure 7:
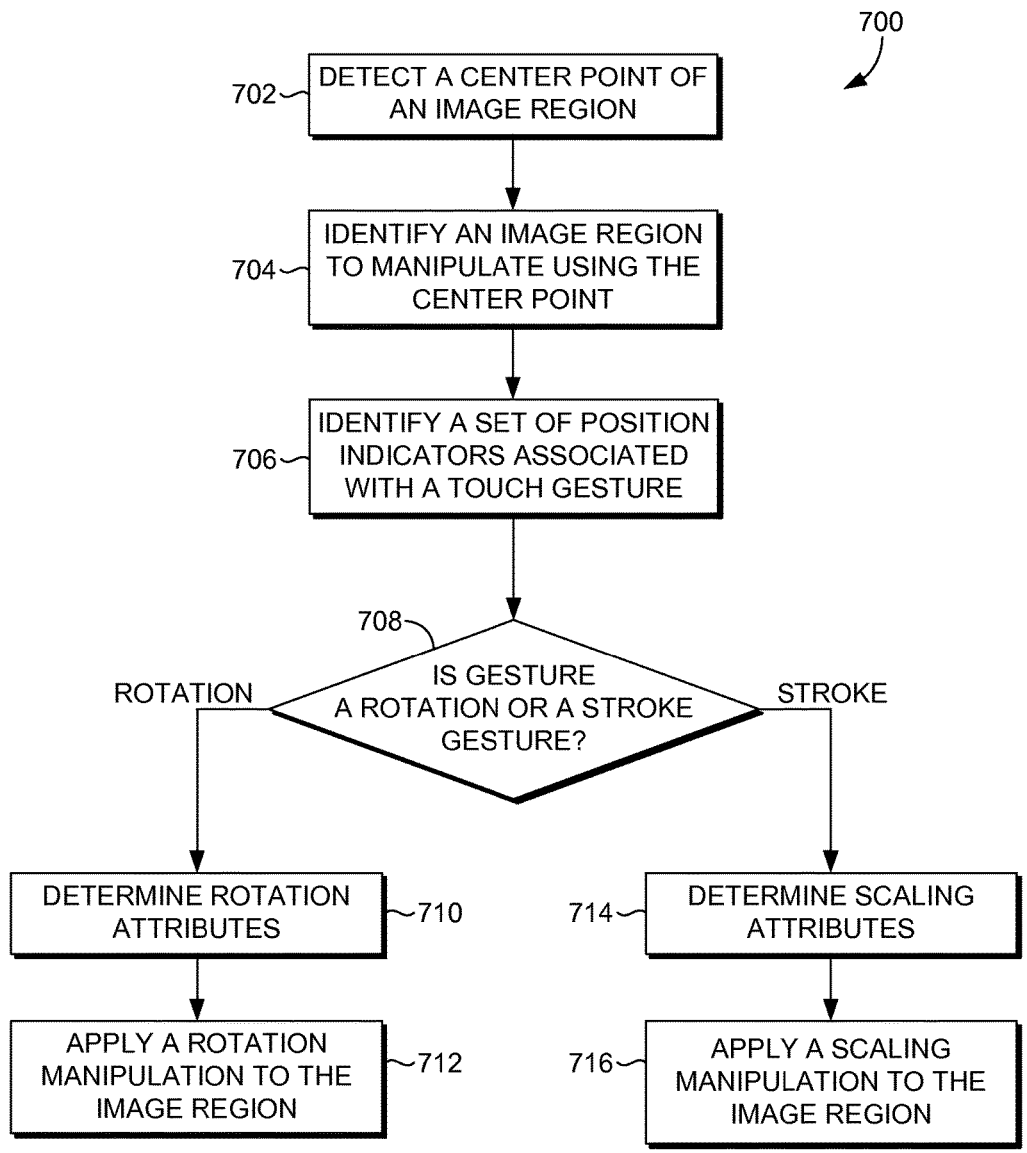
FIG. 7 is a flow diagram showing a method for facilitating image region manipulation based on a touch gesture according to various embodiments of the present invention.

Turning now to FIG. 7, a flow diagram is provided that illustrates a method 700 for facilitating image manipulation based on a touch gesture, in accordance with embodiments of the present invention. Initially, as shown at block 702, a center point of an image region is detected. In some cases, a center point may be selected by a user by a user's contact with the touch screen. At block 704, an image region to manipulate is identified using the detected center point. The image region may be identified using the center point and a predetermined radius size.

As shown at block 706, a set of position indicators associated with a touch gesture is identified. Such position indicators indicate a position at which a touchscreen display is touched or contacted. As can be appreciated, in embodiments, the set of position indicators includes position indicators sequentially captured, with each position indicator being captured upon a lapse of a time component (e.g., a time duration of 0.03 seconds).

At block 708, the position indicators are used to determine if the gesture is a rotation gesture or a stroke gesture. As can be appreciated, in some embodiments, steering angles may be used to determine whether the touch gesture is a rotation gesture or a stroke gesture. If it is determined that the touch gesture is a rotation gesture, at block 710, rotation attributes associated with the set of position indicators are determined to indicate an rotation to apply to the image region. For example, a rotation direction and a rotation magnitude may be determined for applying to the image region. Thereafter, a rotation manipulation is applied to the image region in accordance with the determined rotation attributes. This is indicated at block 712.

Returning to block 708, if, on the other hand, the touch gesture is determined to be a stroke gesture, at block 714, scaling attributes associated with the set of position indicators are determined to indicate a scaling to apply to the image region. For example, a type of scaling (e.g., zoom-in or zoom-out) and scaling magnitude may be determined for applying to the image region. Thereafter, a scaling manipulation is applied to the image region in accordance with the determined scaling attributes, as indicated at block 716.

Figure 8:
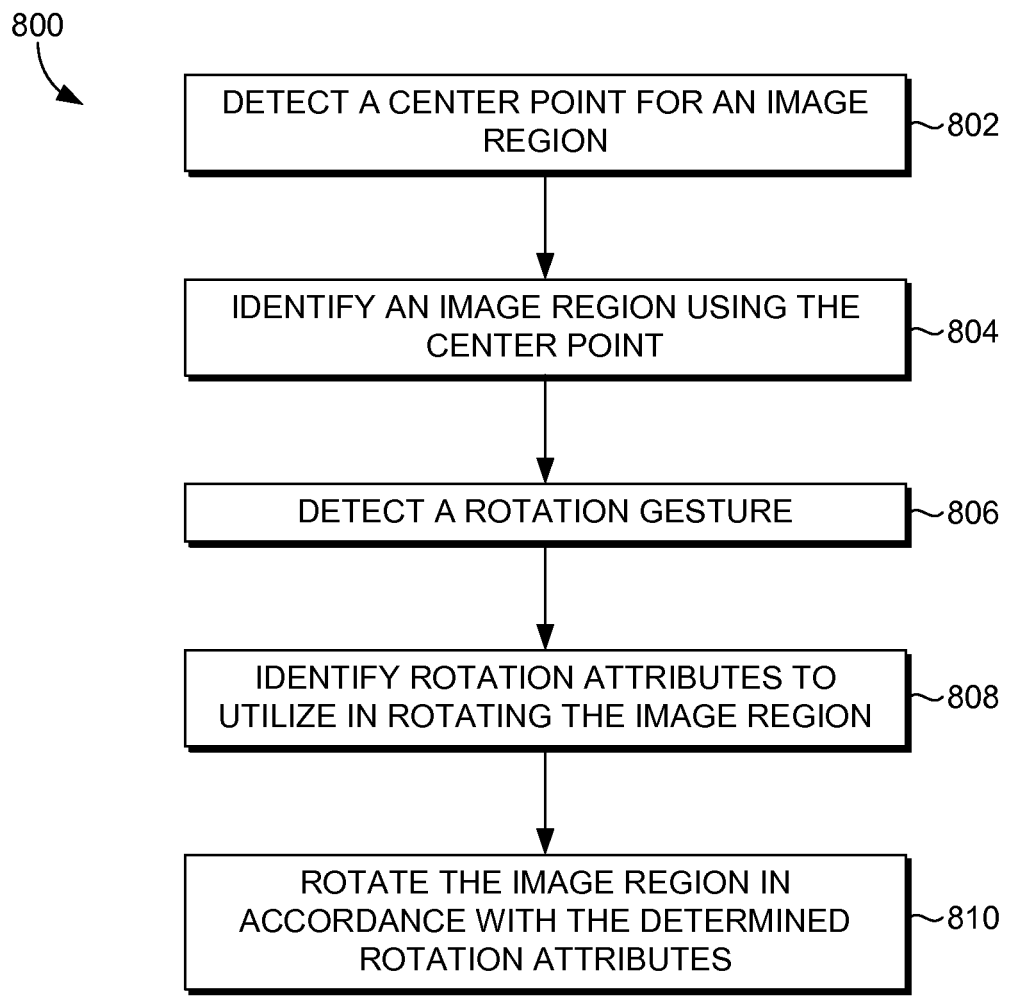
FIG. 8 is a flow diagram showing a method for applying a rotation to an image region, according to one embodiment of the present invention.

Turning now to FIG. 8, a flow diagram is provided that illustrates a method 800 for applying a rotation to an image region, according to embodiments provided herein. Initially, at block 802, a center point for an image region is detected. A center point of an image region might be designated by a user based on a touch input provided by a user that selects a point within the image. At block 804, an image region is identified using the center point. In some embodiments, an image region may be identified based on a center point and predetermined radius size. At block 806, a rotation gesture is detected, for example, when a user provides a rotational or circular touch motion via a touchscreen display. A rotation gesture can be detected in any manner, such as, for instance, utilizing steering angles associated with position indicators indicating touch positions of the gesture. At block 808, rotation attributes to utilize in rotating the image region are identified. Rotation attributes, such as direction and magnitude of rotation, can be determined in any number of ways. For example, in some cases, steering angles associated with a set of position indicators each indicating a position associated with the rotation gesture are referenced. Steering angles may be identified using magnitudes and/or directions. In implementation, line segments between each of the position indicators may be used to determine the steering angles. The steering angles may be exterior angles or interior angles and may be measured in any number of units, such as degrees or radians, and/or directions. Further, a rotation magnitude is determined for applying to an image region. In this regard, an extent of which to rotate an image region can be determined. In some cases, a rotation magnitude might be equal to the average steering angle. In other cases, a rotation magnitude might be a product of the average steering angle multiplied by a constant factor, such as 0.02. Such a constant factor might be used, for example, to slow the rotation of the image such that a gesture representing one revolution does not result in the image being rotated 360 degrees. At block 810, the image region is rotated in accordance with the determined rotation attributes, such as magnitude and direction.

Figure 9:
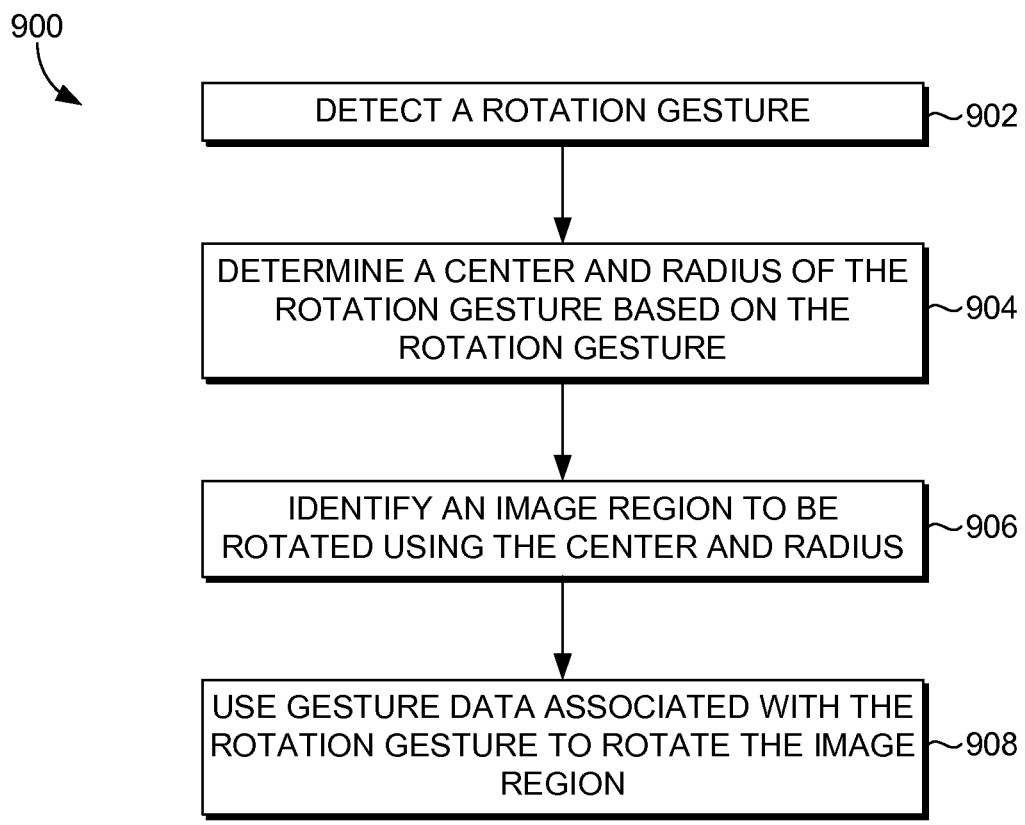
FIG. 9 is a flow diagram showing another method for applying a rotation to an image region, according to one embodiment of the present invention.

With reference now to FIG. 9, a flow diagram is provided that illustrates another method 900 for applying a rotation to an image region, according to embodiments provided herein. Initially, at block 902, rotation gesture is detected. Based on the rotation gesture, at block 904, a center and radius of the rotation gesture is determined. The center and radius is used to identify an image region to be rotated, as indicated at block 906. In some embodiments, a radius is computed from an inverse of the curvature of the rotation gesture. At block 908, gesture data associated with the rotation gesture is used to rotate the image region. For example, a magnitude and direction for rotating the image region can be determined and used to rotate the image region.

Figure 10:
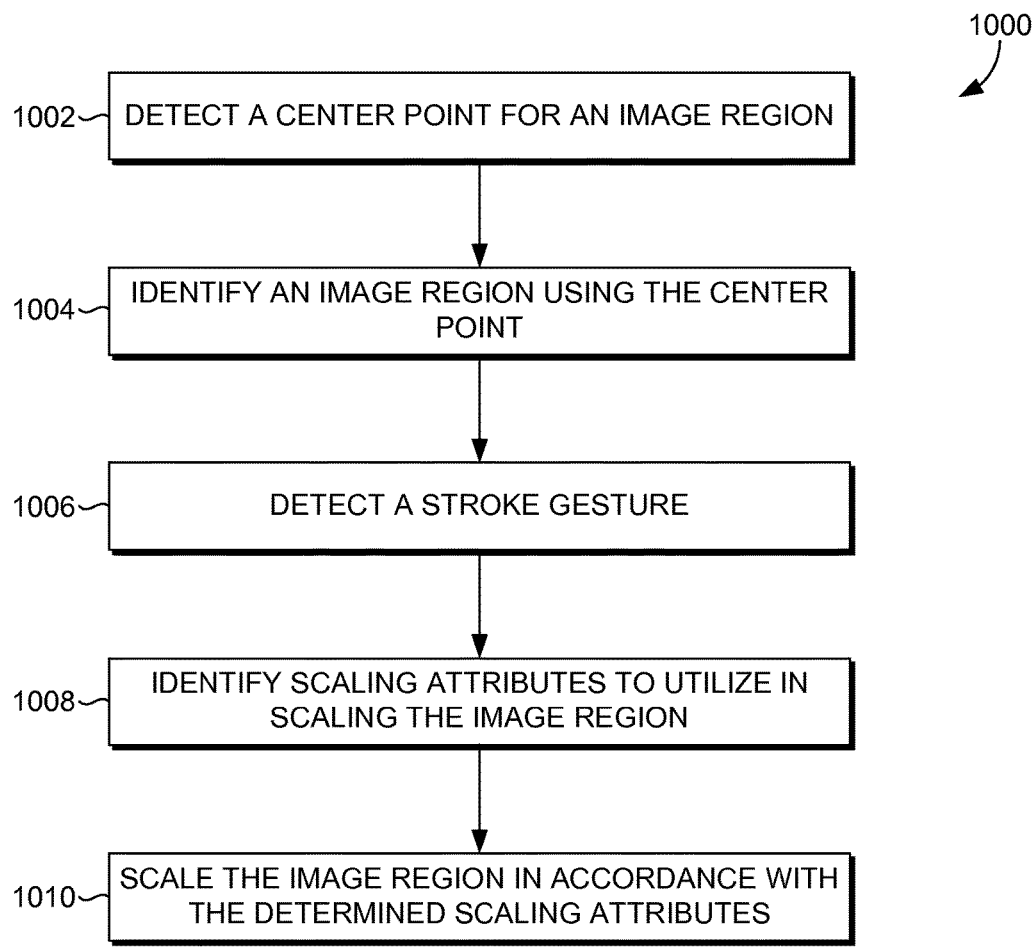
FIG. 10 is a flow diagram showing a method for applying a scaling manipulation to an image region, according to one embodiment of the present invention.

With reference now to FIG. 10, a flow diagram is provided that illustrates a method 1000 for applying a scaling manipulation to an image region, according to embodiments provided herein. Initially, at block 1002, a center point for an image region is detected. A center point of an image region might be designated by a user based on a touch input provided by a user that selects a point within the image. At block 1004, an image region is identified using the center point. In some embodiments, an image region may be identified based on a center point and predetermined radius size. At block 1006, a stroke gesture is detected, for example, when a user provides an approximately straight touch motion via a touchscreen display. A stroke gesture can be detected in any manner, such as, for instance, utilizing steering angles associated with position indicators indicating touch positions of the gesture. At block 1008, scaling attributes to utilize in scaling the image region are identified. Scaling attributes, such as direction and magnitude of scaling, can be determined in any number of ways. For example, in cases that touch motion is generally towards the center point of the image region, a zoom-in or bloat attribute may be determined. On the other hand, in cases that a touch motion is generally away from a center point of the image region, a zoom-out or pucker attribute may be determined. Further, a distance between position indicators associated with touch motion may be used to determine a magnitude at which to scale of image region. At block 1010, the image region is scaled in accordance with the determined scaling attributes, such as magnitude and direction.

Figure 11:
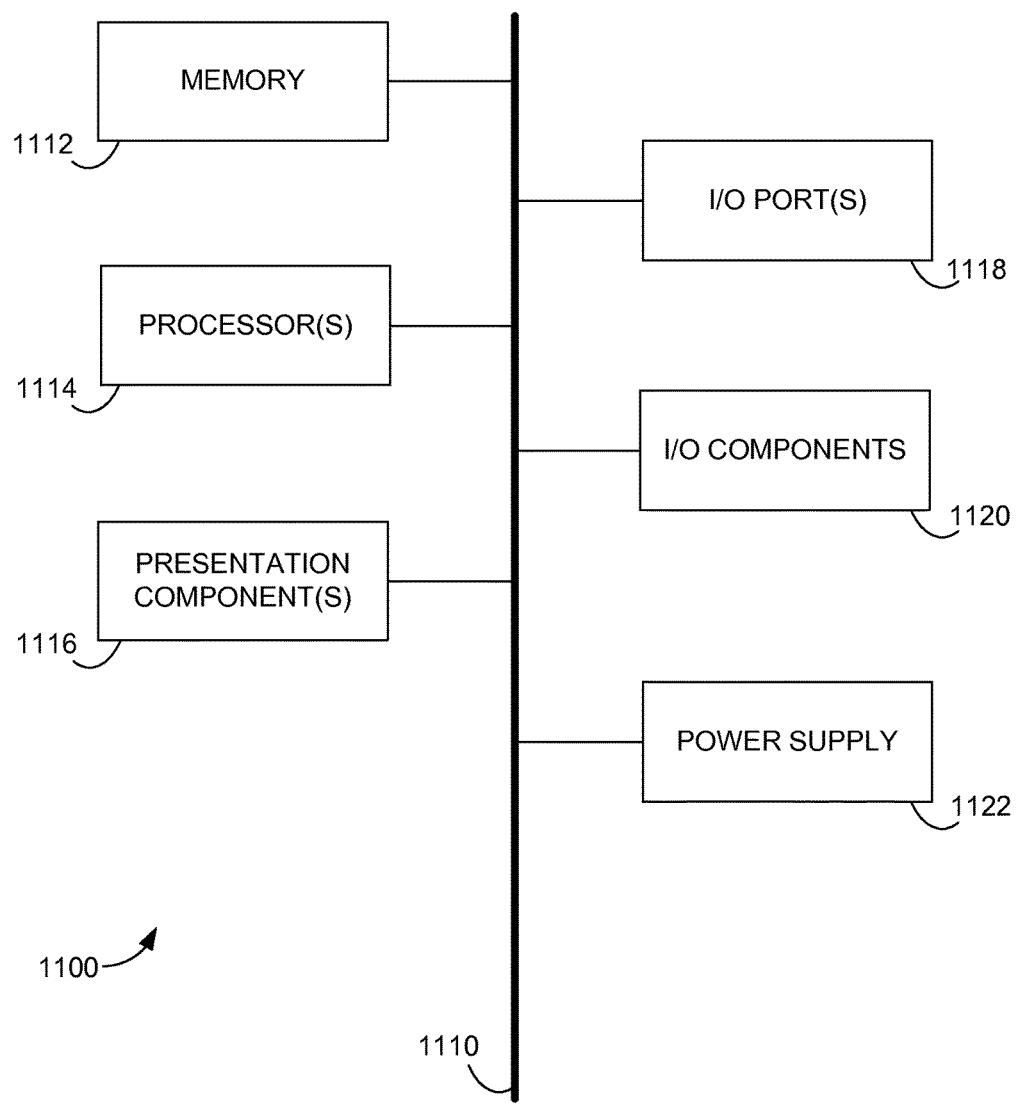
FIG. 11 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output (I/O) ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 120. Presentation component(s) 1116 present data indications to a user or other device. Exemplary presentation components include a display device, speaker, printing component, vibrating component, etc.

I/O ports 1118 allow computing device 100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As can be understood, embodiments of the present invention provide for, among other things, facilitating image manipulation based on a user gesture. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   determining a center point for an image region of a displayed image based on a first touch input by a user received through a physical touch interface, the image region being a portion of an image being edited;
   using the center point and a radius to determine the image region to be manipulated within the displayed image;
   detecting a second touch input by the user received through the physical touch interface to manipulate the image region, wherein the second touch input is used to determine a manipulation to apply to the image region and
   editing the image by manipulating the image region, wherein when the second touch input comprises a stroke input, the image is edited using a scaling manipulation, the scaling manipulation having a first magnitude at the center point of the image region and a second magnitude approaching an edge of the image region, wherein the first magnitude is greater than the second magnitude.

2. The one or more computer storage media of claim 1, wherein the radius is a predetermined radius size.

3. The one or more computer storage media of claim 1, wherein the radius is a distance between the center point and a point at which the second touch input initiated.

4. The one or more computer storage media of claim 1, wherein the second touch input comprises a rotational input.

5. The one or more computer storage media of claim 4, wherein the manipulation comprises a rotational manipulation to rotate the image region.

6. The one or more computer storage media of claim 5, wherein the rotational manipulation to rotate the image region comprises a rotational direction and a rotational magnitude that is determined based on the second touch input.

7. The one or more computer storage media of claim 1, wherein the second touch input comprises a stroke input.

8. The one or more computer storage media of claim 7, wherein the manipulation comprises a scaling manipulation to manipulate a scale of the image region.

9. The one or more computer storage media of claim 8, wherein the scaling manipulation to scale the scale of the image region comprises a scaling direction and a scaling magnitude that is determined based on the second touch input.

10. The one or more computer storage media of claim 9, wherein the scaling direction comprises an expansion of the scale of the image region when the second touch input is in a direction towards the center point, and the scaling direction comprises a contraction of the scale of the image region when the second touch input is in a direction away from the center point.

11. One or more computer storage media storing computer-useable instructions that, when used by one or more computing devices, cause the one or more computing devices to perform operations comprising:
  determining by a computing device that a first gesture is provided by a user in a rotational motion;
  determining a center and a radius based on the first gesture in accordance with the rotational motion;
  identifying a first image region within an image presented via display to be rotated based on the center and the radius determined from the first gesture;
  editing the image by applying a rotation to the first image region based on the center and the radius determined from the first gesture;
  determining that a second gesture is provided by the user in a stroke motion after the first gesture;
  determining a center based on the second gesture in accordance with the stroke motion;
  identifying a second image region to be scaled within the image presented via the display based on the center determined from the second gesture; and
  editing the image by applying a scaling of a scale of the second image region within the image presented via the display, wherein the scale of the second image region of the image being edited is provided a first magnitude at the center of the second image region and a second magnitude approaching an edge of the second image region, wherein the first magnitude is greater than the second magnitude,
  wherein at least one of the first gesture or the second gesture is received through a physical touch interface.

12. The media of claim 11, wherein the rotational motion is determined based on steering angles associated with the first gesture being consistent in direction, wherein steering angles are angles between position indicators associated with the first gesture.

13. The media of claim 11, wherein the stroke motion is determined based on steering angles associated with the second gesture being inconsistent in direction.

14. The media of claim 11, wherein the rotation applied to the first image region is a rotation within a plane corresponding with the display.

15. The media of claim 11, wherein the scaling of the second image region comprises an expansion or contraction of the scale.

16. One or more computer storage media storing computer-useable instructions that, when used by one or more computing devices, cause the one or more computing devices to perform operations comprising:
  detecting a rotational touch input received through a physical touch interface, the rotational touch input comprising a set of position indicators indicating positions of the rotational touch input;
  using the set of position indicators to determine an image region to be manipulated within an image presented via a display, wherein the image region is determined based on a center point and a radius derived using the set of position indicators indicating positions of the rotational touch input;
  using the set of position indicators to determine a direction and a magnitude to rotate the image region; and
  editing the image by rotating the image region within the image, wherein the image region is rotated in the direction and in proportion to the magnitude determined from the set of position indicators.

17. The media of claim 16, wherein the radius is computed from an inverse of a curvature of the rotational touch input.

18. The media of claim 16, wherein the center point is presented to the user.

* * * * *